Nov. 4, 1958     O. B. SHERMAN ET AL     2,858,564
METHOD AND APPARATUS FOR MAKING PLASTIC ARTICLES
Filed Aug. 18, 1954     4 Sheets-Sheet 3
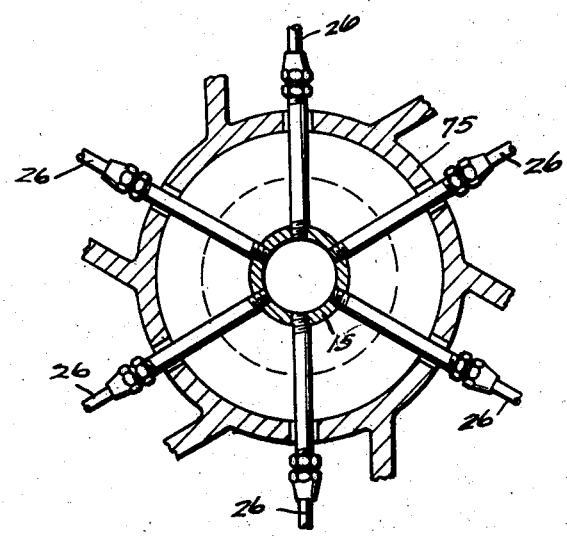
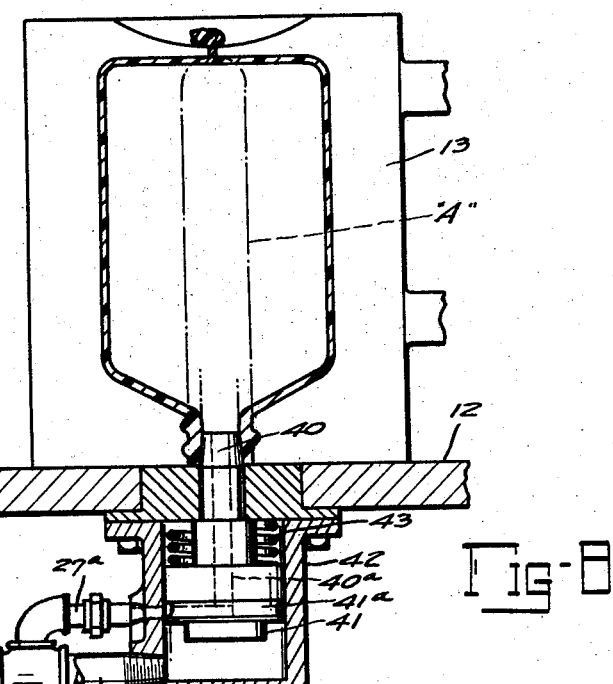
INVENTOR
ORVILLE B. SHERMAN
LEONARD D. SOUBIER
ATTORNEYS Nov. 4, 1958     O. B. SHERMAN ET AL     2,858,564
METHOD AND APPARATUS FOR MAKING PLASTIC ARTICLES
Filed Aug. 18, 1954
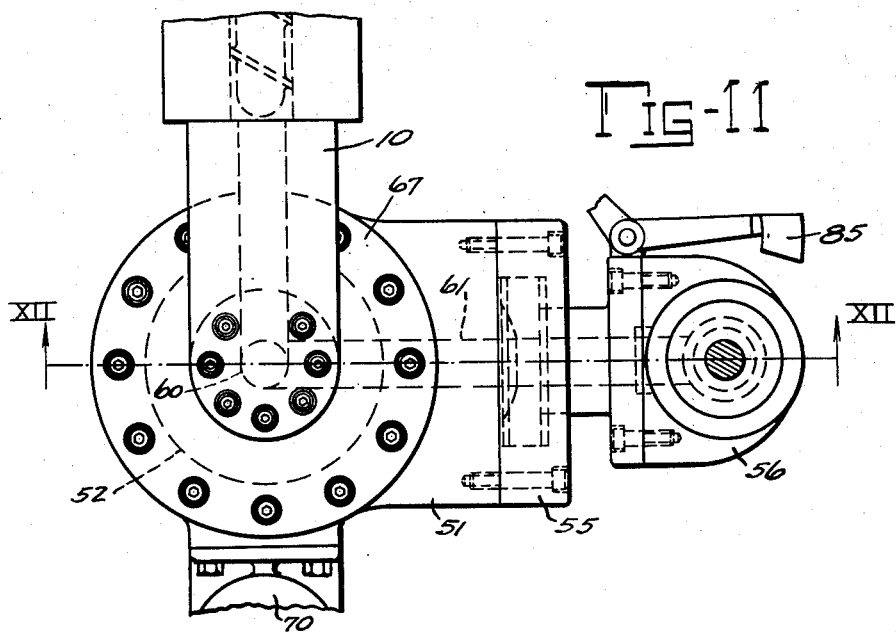
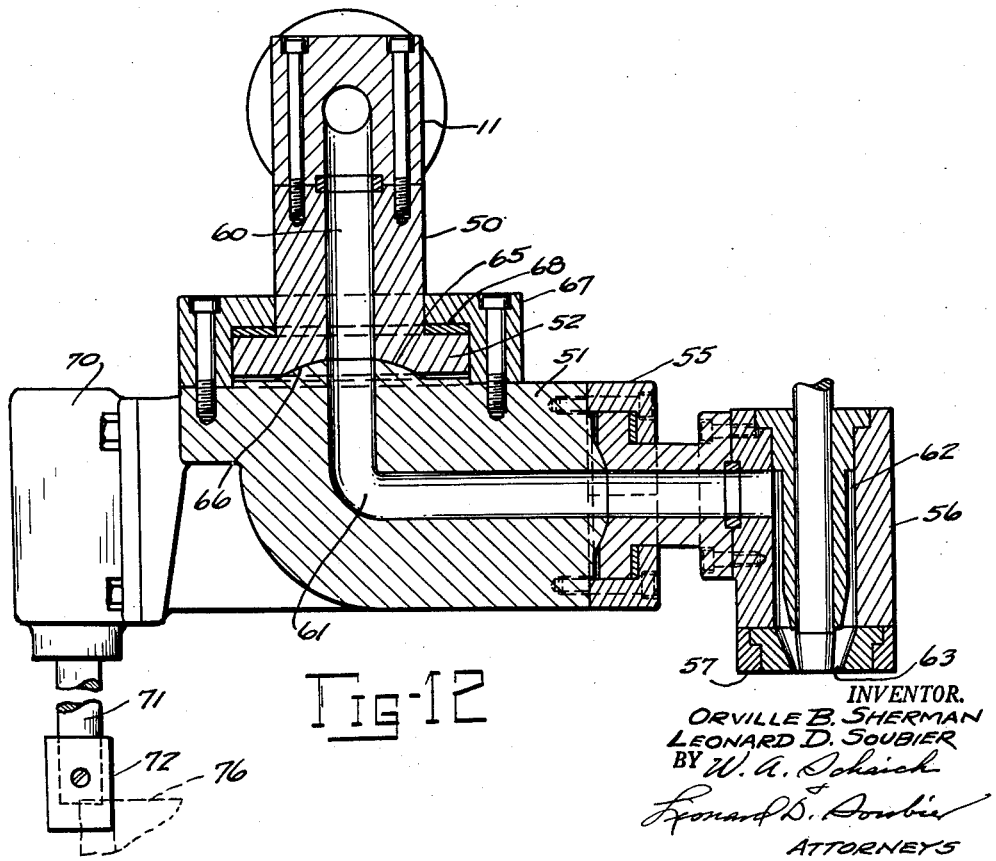
INVENTOR.
ORVILLE B. SHERMAN
LEONARD D. SOUBIER
ATTORNEYS

United States Patent Office 2,858,564
Patented Nov. 4, 1958

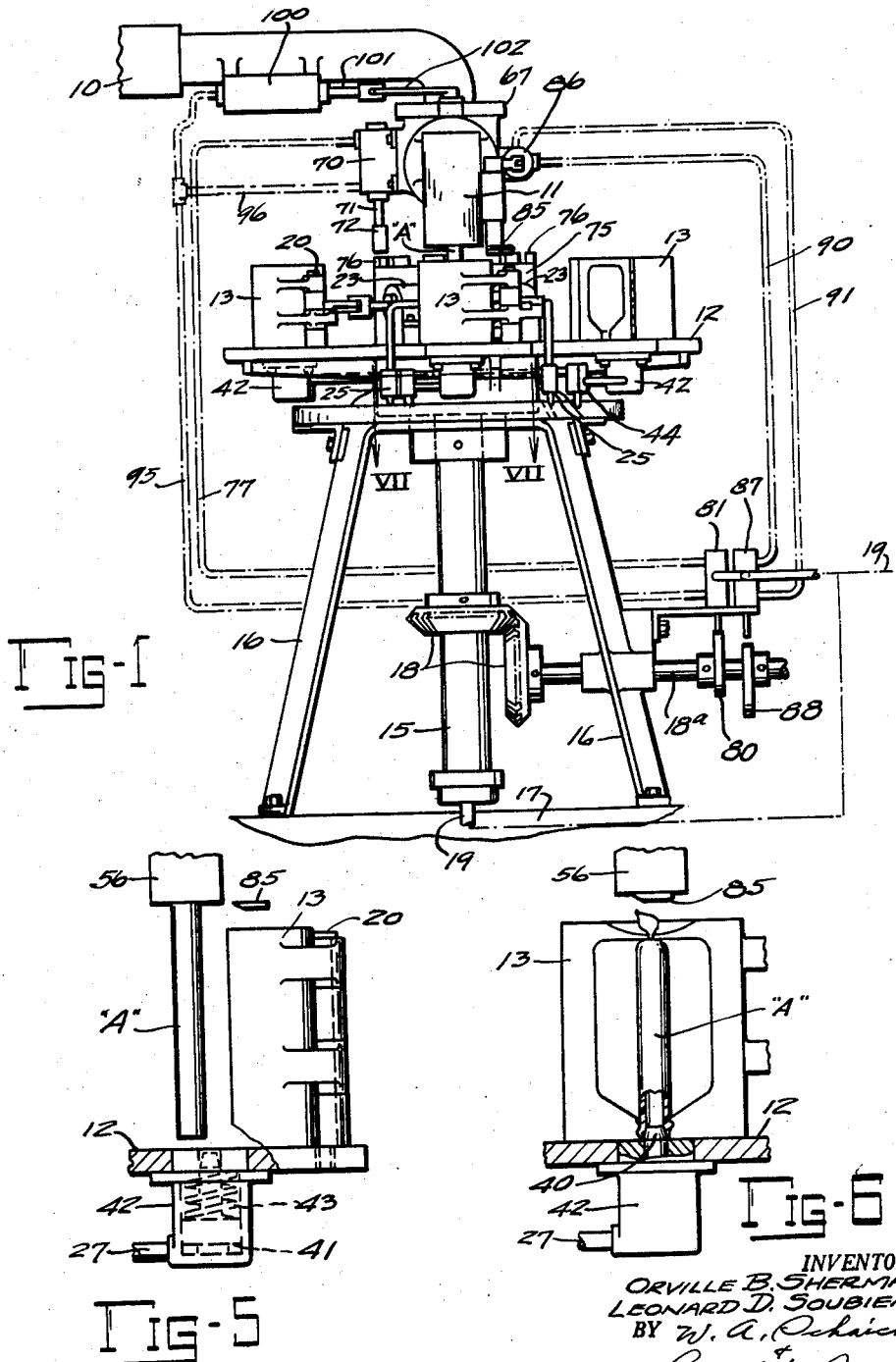

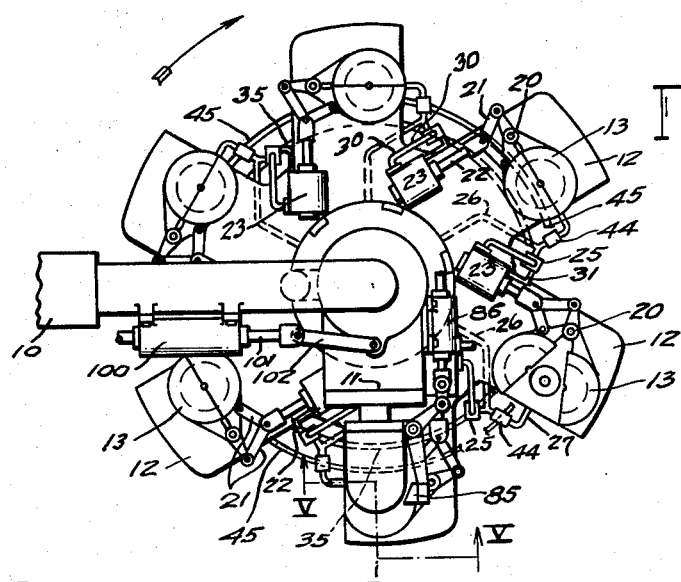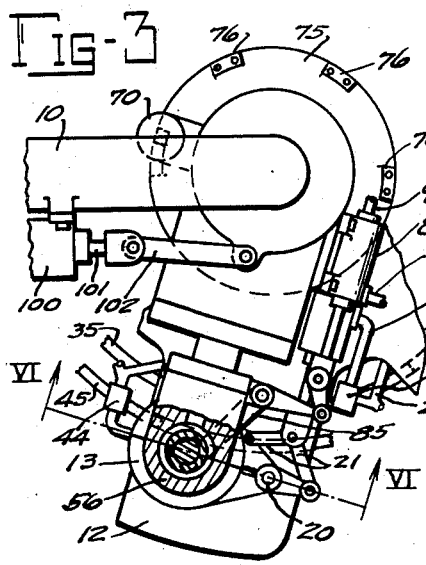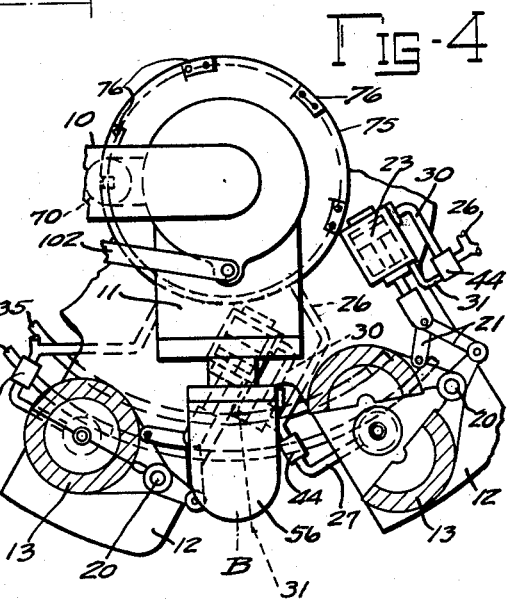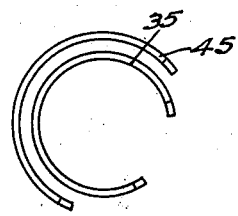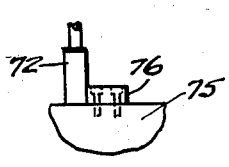

2,858,564

METHOD AND APPARATUS FOR MAKING PLASTIC ARTICLES

Orville B. Sherman and Leonard D. Soubier, Toledo, Ohio, assignors to Owens-Illinois Glass Company, a corporation of Ohio Application August 18, 1954, Serial No. 450,604

7 Claims. (Cl. 18—5)

This invention relates to the production of plastic articles formed from extruded moldable plastic material, and in particular to the rapid, continuous and automatic production thereof.

Essentially, the invention comprises the continuous extrusion of organic plastic material in tubular form and in moldable condition together with the severing of moldable lengths therefrom to be expanded into finished articles. In addition the continuous extrusion is made from an extrusion head which is adapted to be coordinated and movable in succession with a series of forming molds arranged for continuous movement in a closed path.

A further object is the continuous and uninterrupted production of plastic molded articles in seriatim by and through the use of a series of forming molds adapted for continuous rotation and adapted to receive in succession extruded lengths of tubular formations to be blown to hollow form in succession.

Other objects will be apparent from the following descriptive matter.

In the drawings:

Fig. 1 is an elevational view of the molding machine and extruding device;

Fig. 2 is a plan view showing the relationship between the extrusion head and the molds of the molding machine;

Fig. 3 is a plan view showing the extrusion head and a mold when in cooperative relation;

Fig. 4 is a further plan view showing the extrusion position between the successive mold cooperating positions;

Fig. 5 is an enlarged part sectional elevation view taken at V—V on Fig. 2 showing the blowing mold approaching the extrusion head for cooperation;

Fig. 6 is an enlarged part sectional view taken at VI—VI on Fig. 3 showing the mold closed about the tubular extrusion and in alignment with the extruder;

Fig. 7 is a sectional detailed plan view taken at VII—VII on Fig. 1 of the air distributor;

Fig. 8 is an enlarged view showing the tubular extrusion expanded in the blowing mold;

Fig. 9 is a plan view of the air control cams;

Fig. 10 is a detail view of the releasable connection between the extrusion head and the molding machine;

Fig. 11 is a plan view of the movable extrusion head; and

Fig. 12 is a sectional elevation view taken on line XII—XII of Fig. 11 and showing the swivel bearing connection of the extrusion head.

Referring to the drawings, and in particular to Figs. 1 and 2, there is shown an extruder 10 having a movable head 11 mounted above a circular type molding machine and adapted to cooperate in succession with an annular series of sectional blowing molds 13.

The forming machine consists of a horizontal table 14 supported by a vertical column 15 mounted on legs 16 attached to a base 17. The series of molds 13 are equally spaced circumferentially about the vertical column 15 of the machine, and the table 14 is adapted to be rotated continuously through a train of gears 18 driven through the drive shaft 18ª and through a motor drive not shown. Thus, the molds 13 will move continuously in a closed path. The vertical column 15 is hollow and carries air under pressure which is supplied thereto from any usual source through a main supply line 19.

Each mold unit consists of an inverted blowing mold 13 made in partible halves, hinged about mold posts 20 and having operating link connections 21 to the piston 22 of an operating air motor 23.

For operating the air motor 23, an air distributing valve 25 is mounted on table 14, and supplied by air pressure through main line 26 leading from the hollow column 15. In one position the valve provides air to motor 23 through line 30 to close the molds 13, and in its other position provides air to the opposite end of motor 23 through line 31 to open the molds. Valve 25 is actuated by the stationary circular cam 35 during rotation of table 14 and has contact therewith through its piston 36.

When the piston 36 of the air valve 25 is riding along the cam 35, the mold 13 will be held closed around the tubular length "A" of plastic molding material. When the piston 36 leaves the cam 35, the valve 25 is shifted and the molds 13 will be opened.

Cooperating with each blowing mold 13 is a neck forming plunger 40, operated by the piston 41 of an air motor 42 working against a compression spring 43. This air motor 42 is actuated through valve 44 and said valve is controlled in its operative and inoperative position by a circular cam 45.

When the cam 45 raises the piston 46 of valve 44, air passes from line 26 to line 27 raising the piston 41 of motor 42 and seats the plunger 40 in its operative position. As the piston 41 reaches its top position it permits air to pass from line 27ª to groove 41ª on piston 41 and thence through the plunger passage 40ª to blow the tube "A" to hollow form in mold 13.

With release of valve piston 46 from cam 45, the valve 44 closes and spring 43 of air motor 42 withdraws the plunger 40 and closes off the blowing air through line 40ª.

The plastic material extrusion head 11 is formed in two sections. One is a stationary section 50 attached to the extruder 10 and having its vertical axis parallel to and in alignment with the vertical axis of the molding machine 14. Section 50 has connected thereto a movable section 51 through a horizontal swivel bearing connection 52. Also provided in this extrusion head is a second swivel joint 55 which permits the vertical axis of the extrusion nozzle 56 to be suitably adjusted to bring its mold cooperating face 57 into a horizontal plane level with and matching the top surface of the molds 13.

Extending through the extrusion head 11 and adapted to conduct molding material therethrough is a conduit 60 which is aligned with a further conduit 61 in movable section 51 of the head 11. Conduit 61 leads to an annular chamber 62 in the extrusion nozzle 56 where the material accumulates in annular form and from whence the plastic material is extruded in tubular form through the annular extrusion opening 63.

The swivel bearing 52 is provided with a section of spheroidal surface 65 which matches a like surface 66 formed on the section 51. Locking plate 67 locks the members 52 and 51 together in such manner as to permit oscillating or rotary motion about the vertical axis of the head member 50. A gasket 68 prevents leakage of the molding material.

Attached to one side of the head member 51 is a vertically disposed air motor 70 which carries on the lower end of its piston rod 71 a locking block 72.

Formed on the vertical center line of the molding machine table 14 is a hollow column member 75 having attached to its top horizontal surface a series of locating blocks 76. These blocks are equally spaced about the circumference of the member 75 and have a specific circumferential position with respect to each mold 13. The location of each block 76 is such as to pick up head 11 at the position shown in Fig. 4, and to release same approximately at position shown in Fig. 3.

Referring to Fig. 1, the piston 71 of air motor 70 is shown in retracted position but at this point it will be moved down into contact with its respective locking block 76. A cam 80 mounted on the motor drive shaft 18a is the operating control for valve 81 and moves the valve in a direction to supply air through line 77 to move the piston rod 71 of motor 70 downwardly bringing the block 72 into contact with one of the locking blocks 76. These blocks 76 are attached to the continuously rotating column 75 of the molding machine 14 as shown in Figs. 10 and 12 and rotate in a closed path. Due to the rotation of the column 75 the swivel section 51 of the extruder wil be caused, by this contact between blocks 72 and 76, to move in unison with the mold 13 during at least a portion of the extrusion of tube length "A." In Fig. 5, the extrusion nozzle 56 and mold 13 are illustrated as just approaching the point of alignment and when the center line of the mold 13, cylinder 41 and the nozzle 56 coincide the lock 72 will contact the proper block 76 on the column 75 causing the nozzle and mold to be locked to each other and to move in aligned unison. At the time as these mentioned parts reach this point of alignment the extrusion "A" has about reached its desired length, and simultaneously therewith the neck forming pin 40 and mold 13 move into the closed position shown in Fig. 6. A shearing knife 85 is then actuated to sever the extrusion from the nozzle 56.

This shear 85 is actuated by an air motor 86 controlled by the two-way valve 87, said valve being actuated by a cam 88 mounted on a motor drive shaft 18a. Cam 88 is so contoured that the shearing knife 85 swings into shearing position and immediately upon completion of the sever, it moves back out of shearing position as shown in Fig. 2. The operating air for piston motor 85 is carried from valve 87 through lines 90 and 91.

With the severance of the extrusion "A" from the nozzle 56, valve 81 is actuated to provide air through lines 95 and 96. The air passing through line 96 goes to the bottom end of cylinder 70 raising the locking block 72 from contact with block 76, thus releasing the extruder head 11 from the control of the rotating column 75. The air from line 95 goes to the end of the cylinder 100 which, through its piston 101 and a link connection 102 to the head 11, moves the head about its swivel 52 and returns it to the starting position as shown in Figs. 2 and 4.

In operation the table 14 rotates continuously in a clockwise direction, and as each mold 13 reaches line B as shown in Figs. 2 and 4, the extrusion head 11 is locked in aligned relation with each mold 13 by means of the locks 72 and 76, thus causing the extrusion head to travel clockwise with each successive mold.

At the time the extrusion head and mold are initially locked together, some tubular extrusion has already occurred, as is indicated in Fig. 5, and almost immediately with the locking together of the head 56 and mold 13, the molds will be closed about the tubular extrusion, pinching and closing the upper end thereof and expanding the lower end to the neck of the mold by means of the pressure of the neck forming plunger 40. Simultaneous with the closing of the molds 13, the tubular extrusion is sheared by a member 85 which immediately moves away from the extrusion opening, permitting the tubular extrusion to commence its next successive extrusion.

At the same time as the shearing of the tube occurs, the lock block 72 is disengaged from its particular block 76 on the column 75, and the extrusion head is moved counterclockwise, back to its starting position B, by and through the means of the air motor 100. This counterclockwise motion will bring the parts into the position about as shown in Fig. 5 and the described operations will be repeated in continued succession.

Modifications may be resorted to within the spirit and scope of our invention.

We claim:

1. In an apparatus for making hollow plastic articles, the combination comprising an extruder nozzle adapted to continuously extrude moldable plastic material in unconfined tubular form, a plurality of sectional molds mounted on a mold carriage, means to continuously move said carriage and bring each said mold into successive registered alignment with said nozzle and the tubular form being extruded, means operable intermittently to move said nozzle, said extruded form and a mold in registered unison, means to actuate each mold to enclose and seal the extruded form while in said register, and means to sever the enclosed form from said nozzle.

2. The apparatus in accordance with claim 1 including valve means adapted to admit air under pressure into said enclosed form.

3. In an apparatus for making hollow, plastic articles, the combination comprising: an extrusion nozzle adapted to continuously extrude plastic material vertically downward in tubular form, an annular series of forming molds mounted on a horizontal table, means to rotate said table to move said molds in a closed path, and means operable intermittently to move said nozzle through a portion of said mold path.

4. In an apparatus for making hollow, plastic articles, the combination comprising: an extrusion nozzle adapted to continuously extrude plastic material vertically downward in tubular form, an annular series of forming molds mounted on a horizontal table, means to rotate said table to continuously move said molds in a closed path, means operable to move said nozzle through a portion of said closed path in vertical alignment with an open mold, means to close each said mold about said tubular plastic during said nozzle movement, means to sever the said enclosed material from said nozzle, and means to expand said severed material to the hollow form of the mold.

5. In an apparatus for making hollow, plastic articles, the combination comprising: an extruder nozzle adapted to continuously extrude moldable plastic material downwardly therefrom in unconfined tubular form, a mold carriage, an annular series of vertically disposed sectional shaping molds, mounted on said carriage means to continuously rotate said carriage to move each mold into successive vertical alignment with the extruding material, means operable intermittently to cause said extruder nozzle and each successive mold to move in unison laterally of the direction of extrusion, means to close said molds and seal said extrusion, means to sever the extrusion, and means to expand said extrusion in each mold.

6. The method of making blown plastic articles which includes the steps of continuously extruding from an extrusion nozzle moldable material in unconfined tubular form, moving said tubular form through a limited path during at least a portion of said extrusion, said limited path lying within a closed path defined by the continuous movement of a series of blow molds, enclosing said extrusion in one of said molds while concurrently severing same from its source, and expanding said extrusion in said mold while enclosing a second length of tube in a second mold.

7. The method of making blown plastic articles which includes the steps of continuously extruding from an extrusion nozzle moldable material in unconfined tubular form vertically downward, moving said extruding form through a limited path during at least a portion of said extrusion, said limited path lying within and paralleling the direction of a closed path defined by the continuous movement of a succession of blow molds, enclosing the successive lengths of said extrusion in the said successive molds, severing each said successive length from the source thereof, blowing the said lengths to hollow final form in the molds while enclosing other successive lengths of tube in the successive molds.

References Cited in the file of this patent

UNITED STATES PATENTS

| | | |
|---|---|---|
| 2,230,190 | Ferngren | Jan. 28, 1941 |
| 2,288,454 | Hobson | June 20, 1942 |
| 2,674,006 | Bailey et al. | Apr. 6, 1954 |

FOREIGN PATENTS

| | | |
|---|---|---|
| 697,326 | Great Britain | Sept. 23, 1953 |